United States Patent
Bassler et al.

(10) Patent No.: US 7,524,262 B2
(45) Date of Patent: Apr. 28, 2009

(54) TOROIDAL POWER TRANSMISSION

(75) Inventors: Jürgen Bassler, Winnenden (DE); Steffen Henzler, Böbingen (DE); Dinh Cong Nguyen, Esslingen (DE)

(73) Assignee: Daimler AG, Stuttgart (DE)

( * ) Notice: Subject to any disclaimer, the term of this patent is extended or adjusted under 35 U.S.C. 154(b) by 635 days.

(21) Appl. No.: 11/219,356

(22) Filed: Sep. 2, 2005

(65) Prior Publication Data
US 2006/0025280 A1 Feb. 2, 2006

Related U.S. Application Data

(63) Continuation-in-part of application No. PCT/EP2004/000998, filed on Feb. 4, 2004.

(30) Foreign Application Priority Data
Mar. 4, 2003 (DE) ................ 103 09 569

(51) Int. Cl.
*F16H 15/38* (2006.01)
(52) U.S. Cl. .......................... 476/42; 476/46
(58) Field of Classification Search ............ 476/40, 476/42, 46
See application file for complete search history.

(56) References Cited

U.S. PATENT DOCUMENTS

| | | | |
|---|---|---|---|
| 4,694,704 A | 9/1987 | Kraus | |
| 4,934,206 A | 6/1990 | Nakano | |
| 6,132,331 A | 10/2000 | Imanishi et al. | |
| 6,575,869 B2* | 6/2003 | Ervin | 476/40 |
| 6,935,988 B2* | 8/2005 | Sich et al. | 476/40 |
| 2003/0139252 A1* | 7/2003 | Sich et al. | 476/40 |

FOREIGN PATENT DOCUMENTS

| | | |
|---|---|---|
| DE | 44 44 952 | 4/1997 |
| DE | 199 27 268 | 1/2000 |
| DE | 199 47 851 | 10/2000 |
| EP | 0 507 329 | 10/1992 |
| EP | 0 930 449 | 7/1999 |
| EP | 0 980 992 | 2/2000 |
| EP | 1 174 642 | 7/2001 |
| JP | 06 034 009 | 2/1994 |
| JP | 07 253 145 | 10/1995 |
| JP | 2000 027 963 | 1/2000 |
| JP | 2002 310 251 | 10/2002 |
| WO | WO 00/15978 | 3/2000 |
| WO | 02/44587 | 6/2002 |

* cited by examiner

*Primary Examiner*—David M Fenstermacher
(74) *Attorney, Agent, or Firm*—Klaus J. Bach

(57) ABSTRACT

In a toroidal transmission, wherein power transmission rollers are supported rotatably on pivotable support brackets, the pivot movement of adjacent support brackets is coupled via driver elements which are mounted to the support brackets for pivoting therewith and are arranged axially adjacent to one another and formed by a single component.

9 Claims, 2 Drawing Sheets

TOROIDAL POWER TRANSMISSION

This is a Continuation-In-Part application of International Application PCT/EP2004/000998 filed Feb. 4, 2004 and claiming the priority of German Application 103 09 569.1 filed Mar. 4, 2003.

BACKGROUND OF THE INVENTION

The invention relates to a toroidal power transmission with transmission rollers supported rotatably on pivotable support brackets wherein the pivoting movements of adjacent support brackets is coupled via driver elements mounted to the support brackets for rotation therewith.

U.S. Pat. No. 4,934,206 discloses a toroidal power transmission, which includes a continuously variable drive with two chambers, which provide for an infinitely variable transmission ratio between two driving toroidal pulleys and two driven toroidal pulleys. For this purpose, a pair consisting of one driving toroidal pulley and one driven toroidal pulley is arranged in each chamber. In the chamber, driving and driven toroidal pulleys are operationally connected via at least one roller, which, with variable active radii, has a rolling connection to the toroidal pulleys. The rollers are in each case mounted on a support bracket. The support bracket is supported by two bearings in such a way that it is pivotable about a (longitudinal) axis X-X. For coupling the pivoting movements of a number of support brackets, driver elements, namely driver pulleys, are connected to the support brackets in a rotationally fixed manner.

Further solutions for coupling the pivoting movement of support brackets of a toroidal transmissions are known from the publications DE 199 47 851 A1, U.S. Pat. No. 6,132,331, JP 07253145 A, U.S. Pat. No. 4,694,704, EP 0 980 992 A1 and EP 1 174 642 A1.

It is an object of the present invention to provide an improved arrangement for coupling the pivoting movement of support brackets of a toroidal transmission.

SUMMARY OF THE INVENTION

In a toroidal transmission, wherein power transmission rollers are supported rotatably on pivotable support brackets, the pivoting movement of adjacent support brackets is coupled via driver elements which are mounted to the support brackets for pivoting therewith and are arranged axially adjacent to one another and formed by a single component resulting in advantages for manufacturing and assembly.

The support bracket is supported at one or more bearing locations. The roller is preferably supported between two bearing locations of the support bracket. The support bracket is supported in such a way that it is pivotable about the axis X-X, cf. DE 44 44 952 C2, WO 00/15978, DE 199 27 268 C2, EP 0 930 449 A2 or WO 02/44587 A1. The support bracket is preferably also mounted at the bearing locations so as to be displaceable in the direction of the axis X-X. Displacement is effected, for example, by means of a (hydraulic) adjusting device acting on the support bracket, cf. in this respect said publications or the co-pending application Ser. No. 09/025,227 filed Feb. 18, 1998 assigned to the applicant of the present application.

Two driver elements, which serve for coupling the support brackets, are connected to the support bracket in a rotationally fixed manner. As far as the driver elements are concerned, forces for coupling the pivoting movements are introduced positively and/or non-positively. In particular, the driver elements are coupled to one another via a transmission structure with offset axes. This may be a gear arrangement of driver elements of adjacent support brackets, if appropriate with interpositioning of an intermediate gear. Alternatively, the driver elements can be operationally interconnected via a suitable drive means. This is, for example, a toothed rack, which is operationally connected to driver elements in the form of gears. Alternatively, the driver elements can be designed as friction wheels, which, are engaged at the circumferential surface and thus are connected non-positively to the drive means. Furthermore, a wrap-around means may be used as drive means, with a suitable design of the circumferential surface of the drive elements. According to U.S. Pat. No. 6,132,331, with a corresponding design of the wrap-around means and the driver elements, positive form-locking transmission of the forces for coupling the pivoting movements is possible.

According to the invention, the driver elements of a support bracket are arranged axially (in the direction of the axis X-X) adjacent to one another. The arrangement according to the invention is based on the fact that a pair of forces, oriented transversely to the axis X-X and resulting in a moment which stresses the support bracket and the bearing structures, is generated by the coupling forces of two driver elements. With the embodiment according to the invention, the length of the lever arm for the force pair is reduced, so that the resulting moment is reduced. Accordingly, the components can be dimensioned smaller and/or have a longer life.

Furthermore, the driver elements may be formed by a single component. Such a reduction of the number of components is generally advantageous, for example with regard to manufacturing costs, assembly and operational reliability. In this connection, the single component can be part of the support bracket or it can be an additional component which is connected to the support bracket in particular by means of a shaft/hub connection. According to the invention, the number of connection locations between the support bracket and the driver elements can consequently be reduced. Manufacture of the driver elements is necessarily costly, for example by their adaptation to the drive means. In this connection, it is advantageous if the driver elements which are so costly to manufacture are made as a single component and can thus be produced in the same manufacturing procedure.

If the support brackets are positively coupling via the driver elements, the relative position of the same in the circumferential direction of the support bracket determines the relative position of adjacent support brackets to one another. For accurate functioning of the continuously variable transmission, accurate alignment of the support brackets and thus of the driver elements is necessary. According to the prior art, two driver elements have to be adjusted accurately in relation to a support bracket, the position of the driver elements in relation to one another also having to be maintained accurately. According to the invention, the two driver elements are provided on a single component, for example on a double driver pulley. By virtue of this, the relative position of the two driver elements to one another is predetermined accurately on the single component, so that assembly is simplified and assembly reliability is increased.

In a particular embodiment of the invention, the driver elements are arranged at an axial end region of the support bracket. As a result, assembly can be further simplified, as the axial end regions of the retaining bracket are easily accessible from the outside.

In a preferred embodiment of the toroidal transmission, the support bracket is mounted pivotably about the axis X-X by two bearings. The driver elements are arranged axially outside the bearings. This has advantages with regard to the utilization of construction space, as the toroidal disks, the continuously variable transmission structure, the support brackets and the bearings are accommodated in a confined construction space around a central shaft, while installation space is available for the driver elements around the central shaft.

In a further embodiment of the invention, the driver elements are arranged above the chamber(s). In consideration of the increasing people protection requirements, the drive train is possibly moved further downward in relation to conventional vehicles. In the region of a vehicle tunnel, for example, therefore free construction space is provided above the chambers, in which the driver elements are advantageously arranged. According to a particular development, a hydraulic unit, which serves for displacing the support bracket via a hydraulic adjusting unit, is likewise arranged above the chamber(s). This may be a suitable control plate, a control unit and/or the adjusting unit itself.

The invention will become more readily apparent from the following description of two selected illustrative embodiments of the invention with reference to the accompanying drawings:

DESCRIPTION OF PARTICULAR EMBODIMENTS OF THE INVENTION

Figure 1:
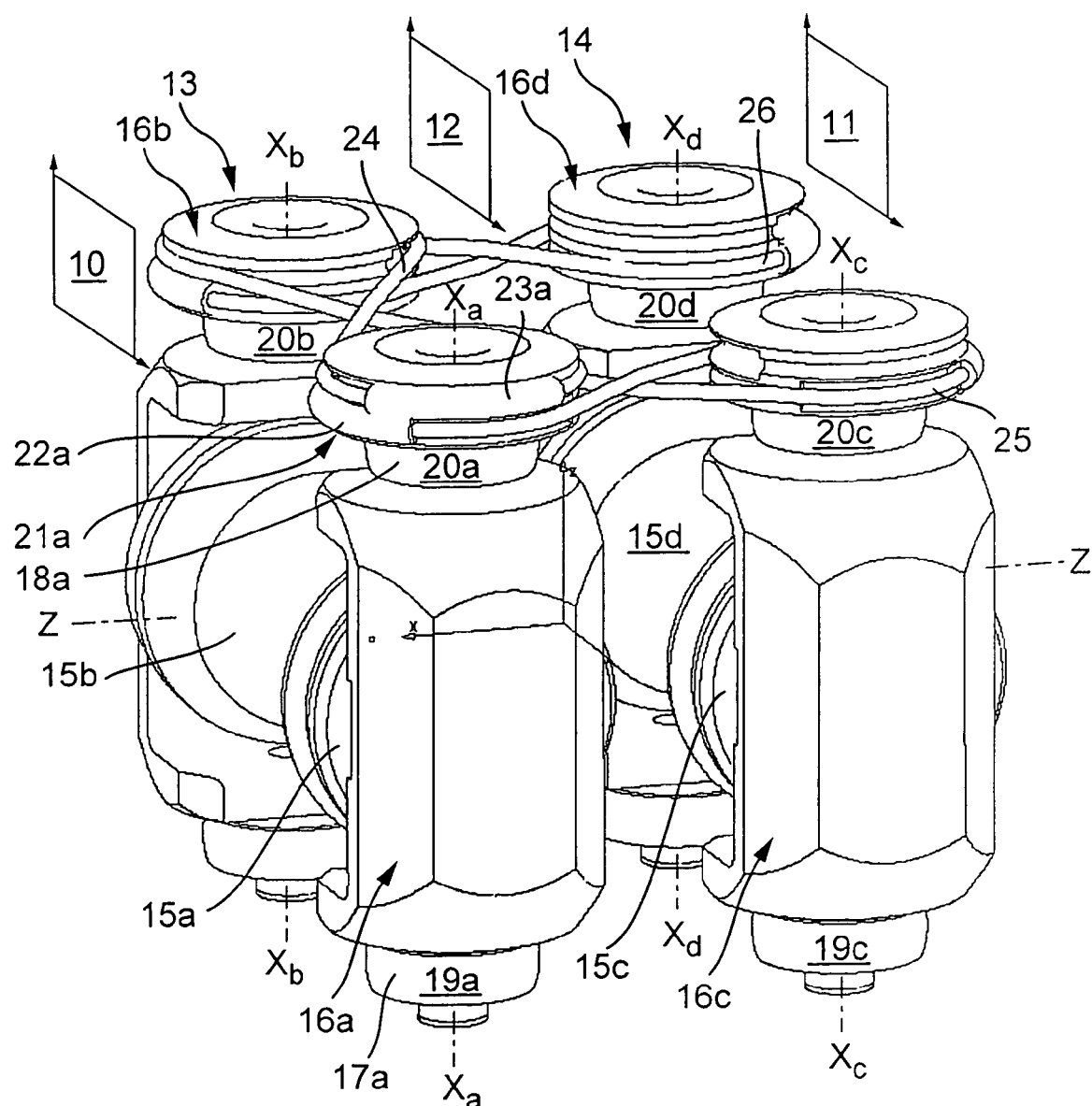
FIG. 1 shows parts of a first illustrative embodiment of a toroidal transmission with a continuously variable transmission structure in a perspective illustration.

The invention finds application in toroidal transmissions, in particular in a continuously variable transmission. The toroidal transmission is preferably used for a motor vehicle. The toroidal transmission is in particular a torque-dividing transmission.

Only the components with which the invention is directly concerned are illustrated in the figures. The integration of the components illustrated into a toroidal transmission is disclosed in said prior art or in DE 102 06 201. In the toroidal transmission disclosed in said publications, two driving and two driven toroidal pulleys, which are oriented transversely to the axis Z-Z, are mounted on main shafts arranged coaxially to the axis Z-Z. For example, the driving toroidal pulleys are arranged in parallel planes 10, 11, while the driven toroidal pulleys are arranged in the parallel plane 12 lying centrally between the planes 10, 11. In each case, a pair consisting of one driving and one driven toroidal pulley forms a chamber 13 or 14 between the planes 10-12 and 12-11 respectively. In the chamber 13, rollers 15a, 15b rotate about an axis oriented transversely to the axis Z-Z. In this connection, the rollers 15a, 15b are in rolling contact with the associated driving and driven toroidal pulleys. The rollers in the chamber 14 are arranged similarly to the above.

The roller 15a is rotatably supported on a support bracket 16a via an eccentric shaft, cf. for example the co-pending DE 103 08 496.7 (MB 503) assigned to the Assignee of the present application. The support bracket 16a is mounted pivotably about the axis X-X. Furthermore, the support bracket 16a is mounted displaceably along the axis X-X. The degrees of freedom of movement are ensured by, in particular two, bearing arrangements (not illustrated). The support bracket is mounted according to the above-mentioned co-pending application of the applicant, according to EP 1 174 642 A1 by means of a bearing rocker supported in relation to the housing, according to EP 0 980 992 A1 or according to cf. DE 44 44 952 C2, WO 00/15978, DE 199 27 268 C2, EP 0 930 449 A2 or WO 02/44587 A1, for example.

According to the illustrative embodiment shown in the figures, the retaining bracket 16a has an essentially U-shaped longitudinal section with a lengthened bottom leg and short side legs, the end regions of which are adjoined by cylindrical extensions 17, 18 facing away from one another in the direction of the axis X-X, which are oriented coaxially to the axis X-X. The extensions 17, 18 each have a cylindrical lateral surface 19, 20, which surfaces serve as bearing surfaces for bearings of the support bracket 16.

The support bracket 16a can be displaced in the direction of the axis X-X by means of a suitable adjusting means (not illustrated). The adjusting means is, for example, a hydraulic adjusting device according to the co-pending application or to other prior art.

In its end region facing away from the roller 15a, the extension 18a carries a double-acting driver pulley 21a, which is connected to the support bracket 16a in a rotationally fixed manner. The driver pulley 21a is connected to the support bracket 16a via a shaft/hub connection and preferably ends flush with it on the axially outer end. The shaft/hub connection may be a conventional connection, for example a screwed connection, splining or a feather key, a one-piece connection to the retaining bracket or a press fit.

The driver pulley 21a has a first driver element 22a, which is mounted in front of a second driver element 23a axially in the direction of the axis X-X in the direction of the roller 15a.

According to the illustrative embodiment shown in FIG. 1, the driver elements 22a, 23a are designed for receiving a drive means in the form of a wrap-around strap or wire for example. For this purpose, the driver elements 22a, 23a have circumferential grooves accommodating the drive means. Moreover, the driver elements have radial recesses, receiving relatively large or form-fit elements of the drive means, so that—if appropriate with some play in the circumferential direction—a positive transmission of coupling forces in the circumferential direction of the driver elements is ensured, cf. U.S. Pat. No. 6,132,331.

The driver elements 22a, 23a have essentially the same outside diameter. Alternatively, the driver elements 22a, 23a can also have different outside diameters. For small pivoting angles about the axis X-X, it is likewise conceivable that the driver elements are not rotationally symmetrical in design, but have a flat portion in the non-active circumferential region. In the region of entry of any projections of the drive means into recesses of the driver elements 22a, 23a, these recesses can be formed by a common recess in the driver pulley 21 or by recesses separated by means of a radial projection.

The other retaining brackets 16b, c, d are designed corresponding to the retaining bracket 16a described above with associated components. In a top view, the axes Xa, Xb, Xc, and Xd form the corners of a square. In this connection, the support brackets 16a, 16b are assigned to the chamber 13, while the support brackets 16c, 16d are assigned to the chamber 14.

The support brackets 16a, 16b, 16c and 16d are interconnected via a drive means 24. According to the figures, it is also possible to provide only a connection of the retaining brackets of one chamber 13 or 14. The drive means 24 enters into operational connection with the drive elements 23a, b of the driver pulleys 21a, b. The drive means 24 has in a top view approximately the shape of an 8, so that a crossing point is disposed centrally between the two support brackets 16a, 16b. To avoid contact at the crossing point, the drive means 24 may be guided via an additional support roller (not illustrated).

Adjacent support brackets 16a, 16c or 16b, 16d are coupled to one another via further drive means 25, 26. The drive means 25 is accommodated in the driver elements 22a, 22c. The drive means 26 is accommodated in the driver elements 22b, 22d. The drive means 25, 26 are thus arranged on that side of the drive means 24 facing the rollers 15a-d. A crossing point likewise present for the drive means 25, 26.

Figure 2:
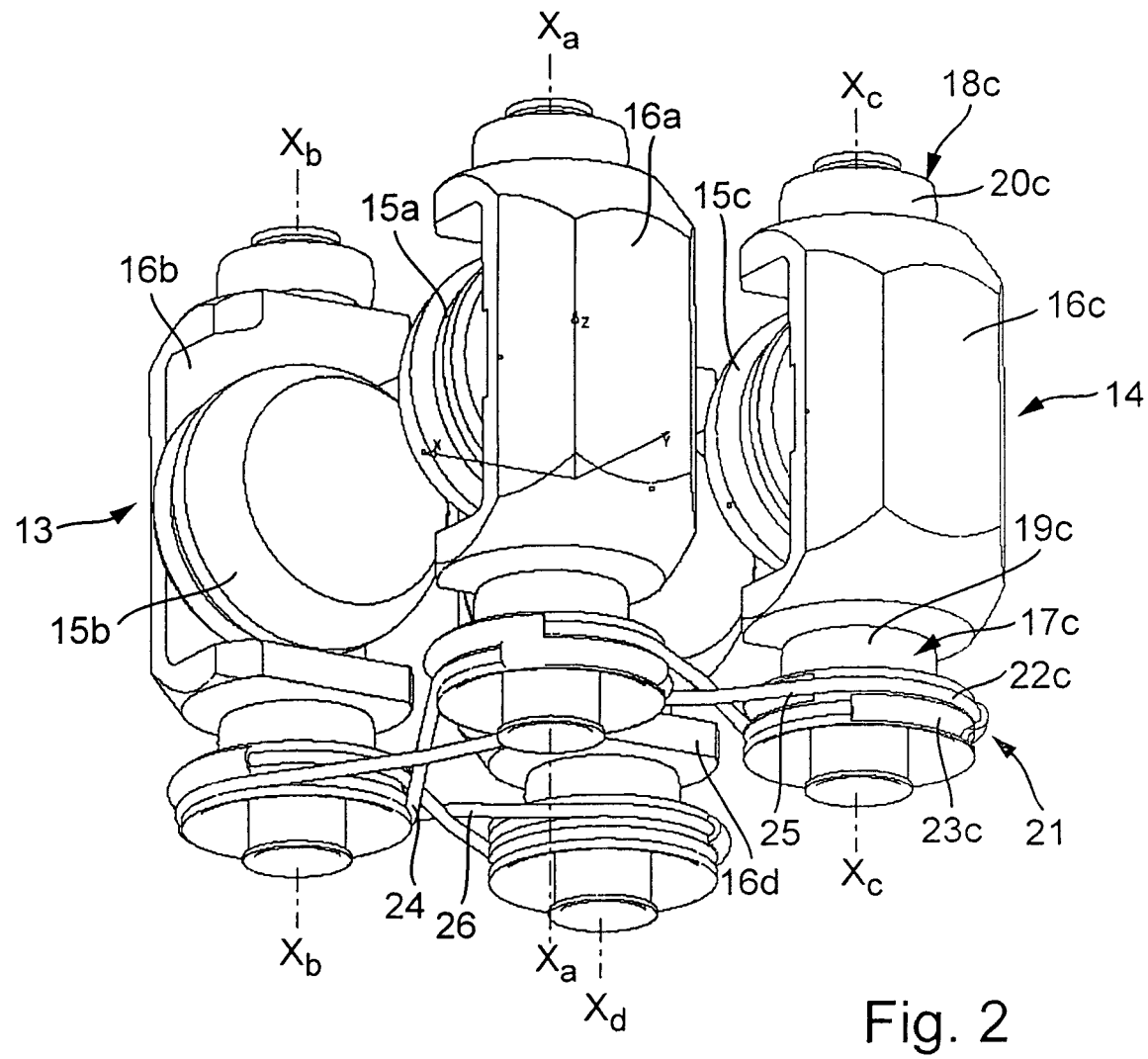
FIG. 2 shows parts of a second embodiment of a toroidal transmission according to the invention with a continuously variable transmission structure in a perspective illustration.

FIGS. 1 and 2 show, by way of example, an actual installation position of the toroidal transmission in a motor vehicle, so that, below, components located at the bottom in the installation position are designated as arranged "at the bottom" and components located at the top in the installation position are designated as arranged "at the top". According to the illustrative embodiment shown in FIG. 1, the driver pulleys 21 with the associated driver elements 22, 23 and the drive elements 24-26 are arranged at the top. In contrast to this, said components are arranged at the bottom according to the illustrative embodiment shown in FIG. 2.

According to the illustrative embodiment shown in FIG. 1, the following order of arrangement of the components in the direction of the axis X-X from the top to the bottom is as follows:
hydraulic unit (not illustrated)—driver pulleys—first bearing—roller with associated part areas of the roller—bearing location.

According to the illustrative embodiment shown in FIG. 2, the order is:
first bearing—roller with associated part areas of the roller—second bearing—driver pulleys—hydraulic unit (not illustrated).

In the embodiment according to FIG. 1 or FIG. 2 the hydraulic unit may also be arranged at the end opposite the driver pulleys. Alternatively or additionally, the driver pulleys may be arranged between a bearing and the roller support bracket.

What is claimed is:

1. A toroidal transmission comprising four support brackets (16a, 16b, 16c, 16d) supported so as to be pivotable about respective axes ($X_a$, $X_b$, $X_c$, $X_d$),
   rollers (15a-15d) rotatably supported one on each of said support brackets (16a, 16b, 16c, 16d) so as to be in rolling contact with toroidal disks for transmitting a driving torque therebetween,
   driver pulleys (21a) connected in a rotationally fixed manner to said support brackets (16a, 16b, 16c, 16d) the driver pulleys (21a) being interconnected via drive means (24, 25, 26) wrapped around the driver pulleys (21a) for coupling the pivoting movement of the support brackets (16a, 16b, 16c, 16d) about the respective axes ($X_a$, $X_b$, $X_c$, $X_d$), two adjacent driver pulleys (21a) being connected to an adjacent one of the other driver pulleys (21a) by the drive means (24, 25, 26) so that all driver pulleys are interconnected for common pivoting of the support brackets (16a, 16b, 16c, 16d),
   the driver pulleys (21a) having driver elements (22, 23) being arranged axially adjacent to one another and being formed by a single component
   so that any bending torque applied to the support brackets (16d, 16b) by the drive means (24, 25) and respectively, (24, 26) is minimized.

2. The toroidal transmission as claimed in claim 1, wherein each driver pulley (21a) is in the form of a double driver pulley (21) having two pulley structures.

3. The toroidal transmission as claimed in claim 1, wherein an at least partly flexible drive means (24, 25, 26) coupling the driver elements (21a) extends between two adjacent ones of the support brackets (16a, 16b, 16c, 16d) of the toroidal transmission and crosses itself between the support brackets (16a-16b, 16a-16c, 16b-16d).

4. The toroidal transmission as claimed in claim 1, wherein one driver element (23a) serves for coupling the pivoting movement of a first support bracket (16a) to the pivoting of an adjacent second support bracket (16b) and a further driver element (22a) serves for coupling said first support bracket (16a) to an other adjacent support bracket (16c).

5. The toroidal transmission as claimed in claim 1, wherein the driver elements (22, 23) are arranged in an axial end region of the support brackets (16a, 16b, 16c, 16d).

6. The toroidal transmission as claimed in claim 1, wherein each support bracket (16a, 16b, 16c, 16d) is mounted pivotably about the respective axis ($X_a$, $X_b$, $X_c$, $X_d$) and the driver pulleys (21a) are arranged axially outside the support brackets.

7. The toroidal transmission as claimed in claim 1, wherein the support brackets (16a- 16d) extend vertically and the driver elements (22, 23) are arranged above the support brackets (16a- 16d).

8. The toroidal transmission as claimed in claim 2, wherein the pulley structures have recesses receiving form-fit elements fixed to the drive means (24, 25, 26) so that each drive means is firmly engaged with the respective pulley structure.

9. The toroidal transmission as claimed in claim 8, wherein the form-fit elements of the two pulley structures of a double driver pulley are formed integrally so that all the drive means are actually operatively interconnected and all four brackets are operated in unison without any slippage.

\* \* \* \* \*